US008727447B2

(12) United States Patent  
Billingsley

(10) Patent No.: US 8,727,447 B2
(45) Date of Patent: May 20, 2014

(54) COMPOSITE SEAT CUSHION AND METHOD OF MAKING SAME

(71) Applicant: Lyn Brandon Billingsley, Montgomery, TX (US)

(72) Inventor: Lyn Brandon Billingsley, Montgomery, TX (US)

(73) Assignee: Heavy Duty Bus Parts, Inc., Willis, TX (US)

( * ) Notice: Subject to any disclaimer, the term of this patent is extended or adjusted under 35 U.S.C. 154(b) by 0 days.

(21) Appl. No.: 13/797,547

(22) Filed: Mar. 12, 2013

(65) Prior Publication Data

US 2013/0193739 A1 Aug. 1, 2013

Related U.S. Application Data

(63) Continuation of application No. 12/201,783, filed on Aug. 29, 2008, now Pat. No. 8,419,136.

(60) Provisional application No. 60/935,785, filed on Aug. 30, 2007, provisional application No. 60/996,067, filed on Oct. 26, 2007.

(51) Int. Cl.
*A47C 7/02* (2006.01)
*B60N 2/24* (2006.01)

(52) U.S. Cl.
USPC ............ 297/452.61; 297/216.13; 297/DIG. 1

(58) Field of Classification Search
USPC ............ 297/DIG. 1, 452.17, 452.61, 452.12, 297/452.58, 452.48, 452.32, 452.26, 297/216.13, 232, 219.1, 228.1
See application file for complete search history.

(56) References Cited

U.S. PATENT DOCUMENTS

| 1,816,802 | A | 7/1931 | Verts |
| 2,838,100 | A | 6/1958 | Follows |
| 3,258,511 | A | 6/1966 | McGregor, Jr. |
| 3,537,751 | A | 11/1970 | Inoue et al. |
| 3,874,731 | A | 4/1975 | Jordan |
| 4,573,741 | A | 3/1986 | Kirchner-Carl |
| 4,973,083 | A | 11/1990 | Richards et al. |
| 5,609,395 | A | 3/1997 | Burch |
| D403,195 | S | 12/1998 | Irwin-Tesmer |
| 7,108,330 | B2 | 9/2006 | Mizelle et al. |
| D536,566 | S | 2/2007 | Burch |
| 7,232,184 | B2 | 6/2007 | Lawler |
| 2006/0076819 | A1 | 4/2006 | Burch |

OTHER PUBLICATIONS

US Notice of Allowance received in connection with U.S. Appl. No. 12/201,783; DTD Dec. 21, 2012.
US Office Action received in connection with U.S. Appl. No. 12/201,783; DTD Dec. 2, 2010.
US Office Action received in connection with U.S. Appl. No. 12/201,783; DTD Feb. 6, 2012.
US Office Action received in connection with U.S. Appl. No. 12/201,783; DTD Jun. 8, 2011.
US Office Action received in connection with U.S. Appl. No. 12/201,783; DTD Aug. 16, 2010.
US Office Action received in connection with U.S. Appl. No. 12/201,783; DTD Sep. 10, 2012.

*Primary Examiner* — Milton Nelson, Jr.
(74) *Attorney, Agent, or Firm* — Foley & Lardner LLP

(57) ABSTRACT

A cushion for a school bus seat can include a single piece of skinned foam including foam and a skin integrally bonded to the foam. The single piece of skinned form can include a cavity. The single piece of skinned foam can be configured to receive at least one of a substantially upright back portion of a school bus seat frame and a substantially horizontal seat portion of the school bus seat frame. The single piece of skinned foam can be configured to be disposed over and to cover at least one of the substantially upright back portion and the substantially horizontal seat portion.

5 Claims, 14 Drawing Sheets

COMPOSITE SEAT CUSHION AND METHOD OF MAKING SAME

CROSS REFERENCE TO RELATED APPLICATIONS

The present application is a continuation of U.S. application Ser. No. 12/201,783, filed Aug. 29, 2008, which claims priority of U.S. Provisional Application No. 60/935,785, filed Aug. 30, 2007, and U.S. Provisional Application No. 60/996,067, filed Oct. 26, 2007, the contents of each of which are hereby incorporated by reference in their entireties.

BACKGROUND

The present invention relates generally to seat cushions and, more specifically, to seat cushions used in buses or other large passenger vehicles.

At present, seats for vehicles can be manufactured by assembling a cushioned cover on a seat frame, such as the frame of a school bus seat. The cushioned cover is often formed by creating a foam envelope. The foam envelope can be created by first cutting or slicing foam into a predetermined thickness and into a front piece, back piece, and outer strip. The strip is located between the front and back pieces and laminated with an adhesive to create the foam envelope having a cavity or envelope shape, which is configured to cover the seat frame when installed.

Additional materials may be added to the foam envelope. For example, Styrofoam kneepads can be added to enhance critical impact areas, e.g., where a passenger's knee may come into contact with the cushioned cover. Additionally, fabric can be added to critical seams to add to quality and longevity of the foam envelope.

After the foam envelope has been formed, it is fitted over the seat frame. A vinyl seat cover is then be placed over the foam envelope to assist in compartmentalization and to create a flame retardant barrier. The addition of the seat cover is typically required to meet regulations, such as FMVSS 222 and FMVSS 302 for school buses.

The seat can provide a higher level of safety by creating compartmentalization. More specifically, the seat is configured to maintain the occupant within a particular space or compartment. The compartmentalization can be enhanced by using a high-hack, well-padded seat designed for specific crash standards.

The seat also should meet specific flammability standards. However, if the outer vinyl cover becomes damaged (e.g., due to vandalism), additional oxygen flow is permitted within the seat. In the event of fire, the additional oxygen flow can increase the heat beyond the flash point of the foam and cause the seat to burn, thereby increasing the potential for fires to spread within the bus.

In the conventional design, the foam envelope may break down within the vinyl cover and the seat frame can become exposed. This can compromise the protection level provided by the foam. Additionally, the intended compartmentalization may become compromised.

SUMMARY

According to an exemplary embodiment, a cushion for a school bus seat comprises a single piece of skinned foam including foam and a skin integrally bonded to the foam. The single piece of skinned foam can include a cavity. The single piece of skinned foam can be configured to receive at least one of a substantially upright back portion of a school bus seat frame and a substantially horizontal seat portion of the school bus seat frame. The single piece of skinned foam can be configured to be disposed over and to cover at least one of the substantially upright back portion and the substantially horizontal seat portion.

According to an exemplary embodiment, a method of making at least a portion of a school bus seat can include the steps of disposing within a mold a material for forming a skin of the school bus seat and disposing on the material a foam material to form a single piece of skinned foam. The single piece of skinned foam can be configured to be disposed over and to cover at least one of a substantially upright back portion of a frame of a school bus seat and a substantially horizontal seat portion of a frame of a school bus seat.

DETAILED DESCRIPTION OF THE EXEMPLARY EMBODIMENTS

According to various exemplary embodiments, the invention disclosed herein may be applied to various seats. The present disclosure uses a school bus seat as an example of a seat where a composite seat cushion may be used.

Figure 7:
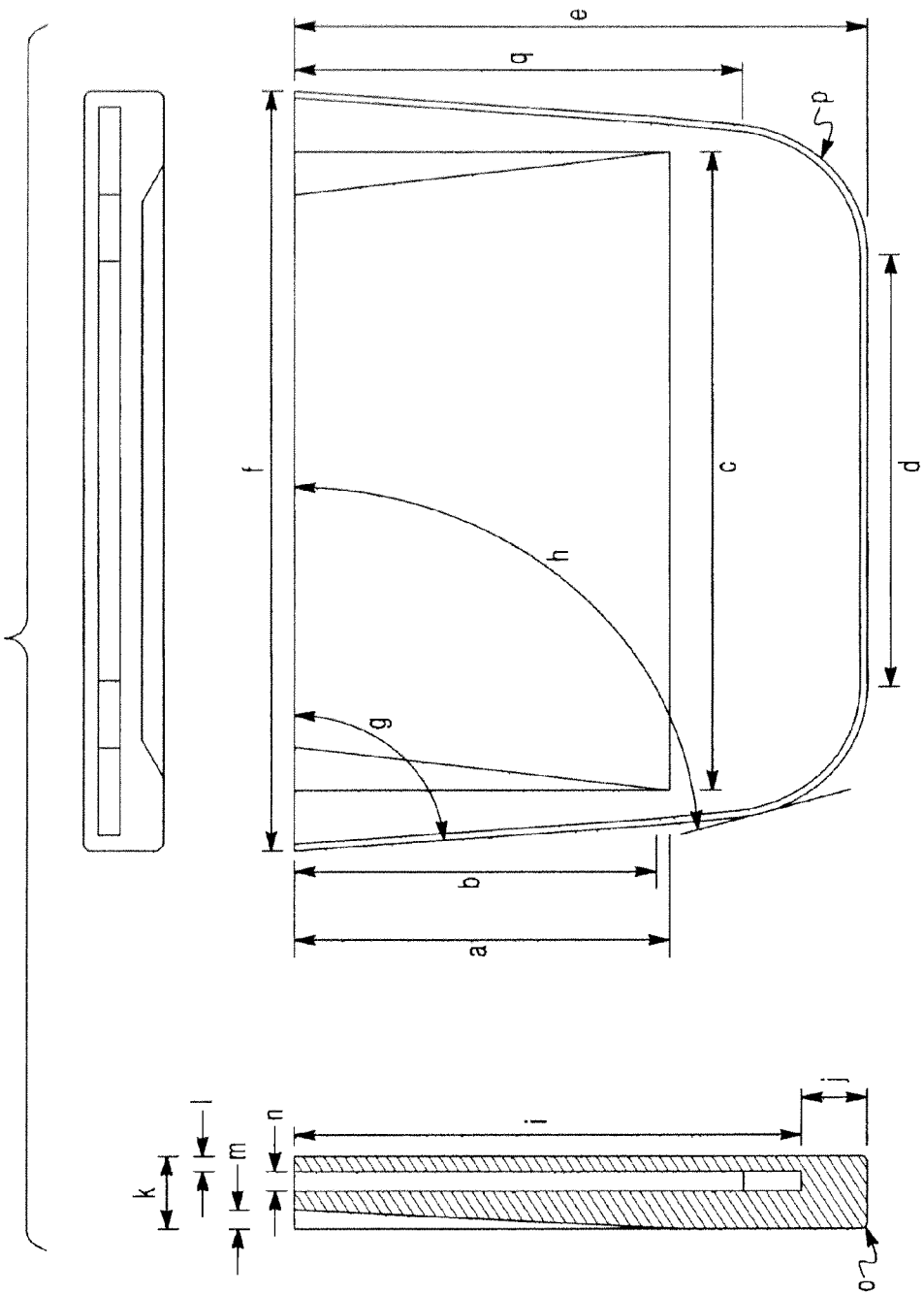
FIG. 7 includes cross sectional drawings of the composite seat cushion, according to an exemplary embodiment.

In general, a composite seat cushion according to the present invention can include a composite foam envelope configured to fit over a bus seat frame. FIG. 7 shows cross-sectional views of an embodiment of such a composite seat cushion, wherein an envelope structure is provided by creating a cavity in the mid-region of the composite seat cushion. The composite seat cushion can include an outer "skin-like" surface and an inner "foam" or "foam-like" substance. The envelope is preferably designed to meet or exceed federally mandated specifications for such a product, providing safety in various conditions such as a fire or a collision event. Though shown as having a cavity, the composite seat cushion could be solid, if necessary.

FIGS. 1 through 6 illustrate an embodiment of a method of forming a composite seat cushion according to the present invention.

Figure 1:
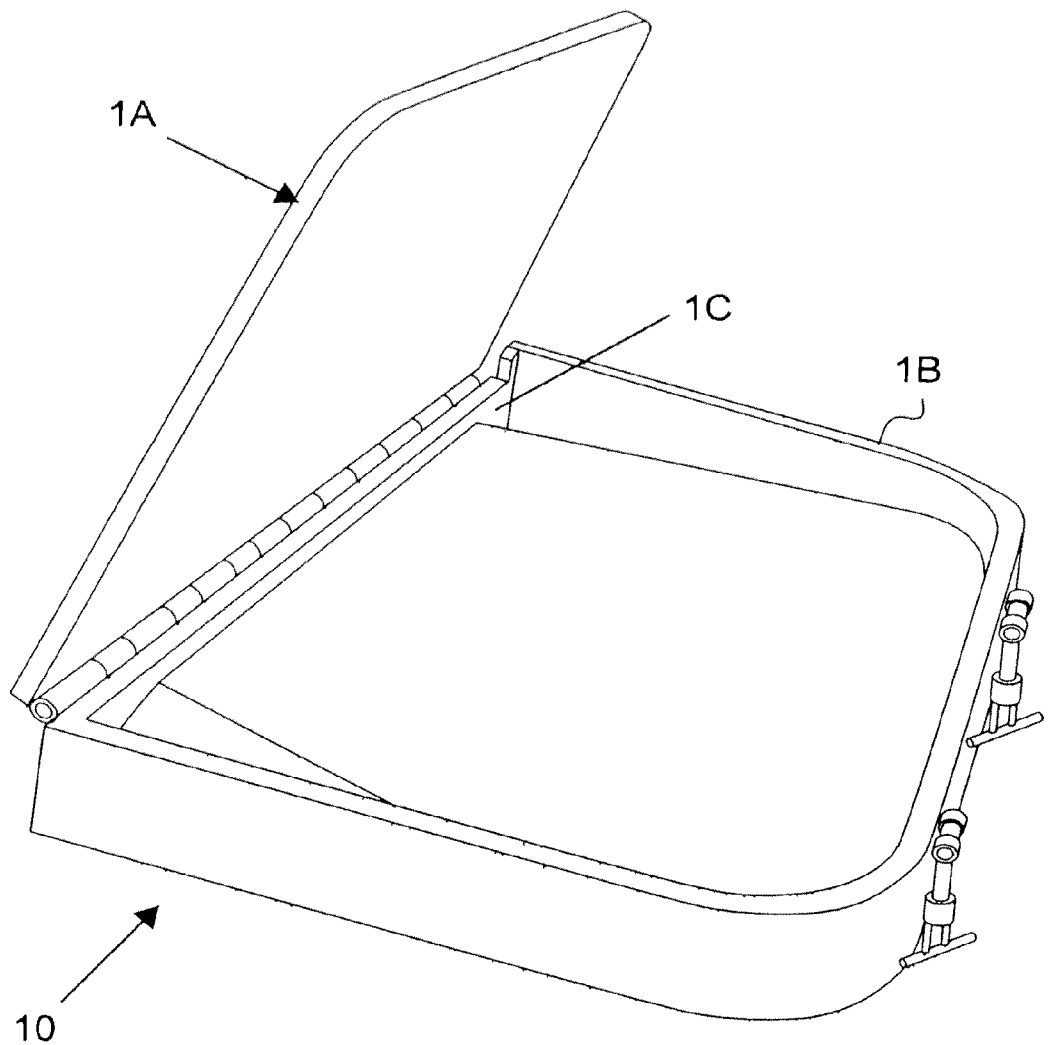
FIG. 1 is an isometric view of a mold that is used to create a composite seat cushion, according to an exemplary embodiment.

FIG. 1 is a view of a mold 10 used to create a composite seat cushion, according to an exemplary embodiment. The mold 10 may be made of, for example, aluminum. The mold 10 can include an inner core 1A that may be used to form a cavity of a composite seat cushion and a first outer side 1B that defines the parameters of portion of the composite seat cushion. A second outer side 1C of the mold (only partially shown on the left side of FIG. 1) defines the remaining parameters of a composite seat cushion to be formed by the mold 10. The mold 10, specifically either the inner core 1A or the first 1B and second 1C outer sides, may be designed with varying thicknesses and sizes to provide a variety of seat cushion designs. The mold 10 can have more or less outer sides. The mold 10 can also include a top 1D (not shown in FIG. 1 and FIG. 2). The mold 10 may be designed to allow consistent quality to be maintained during production. The mold 10 may be designed to hold other preformed parts of the final product that will eventually cure in the mold 10 during a final step into one single piece or part as described in the exemplary embodiment. The preformed components used in the composite seat cushion may be produced in the same method of production (reaction injection molding) or consist of other prefabricated materials, such as, for example, Styrofoam, that are fabricated to predetermined specifications.

Figure 2:
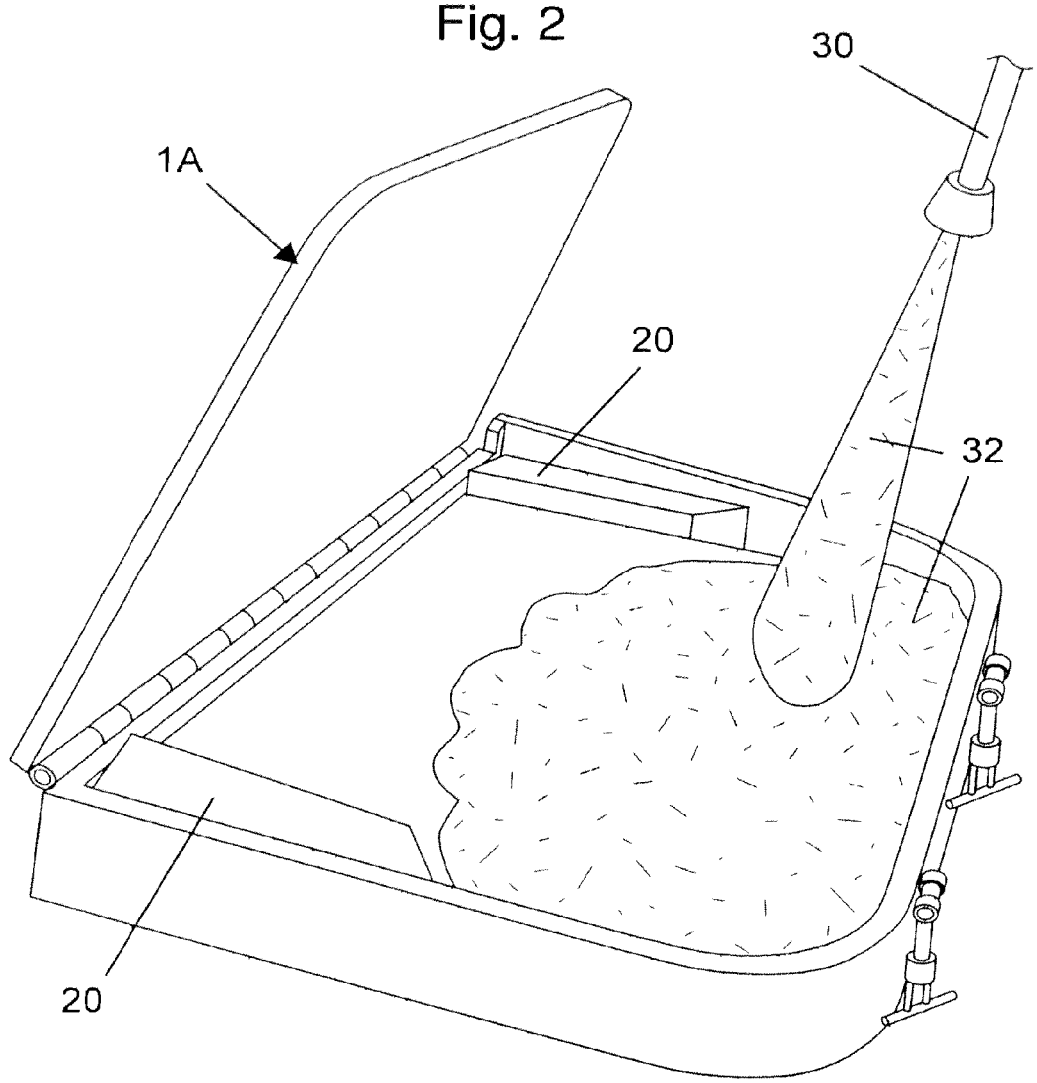
FIG. 2 is an isometric view of the mold of FIG. 1 with knee pad inserts in place and a material being introduced into the mold.
Figure 3:
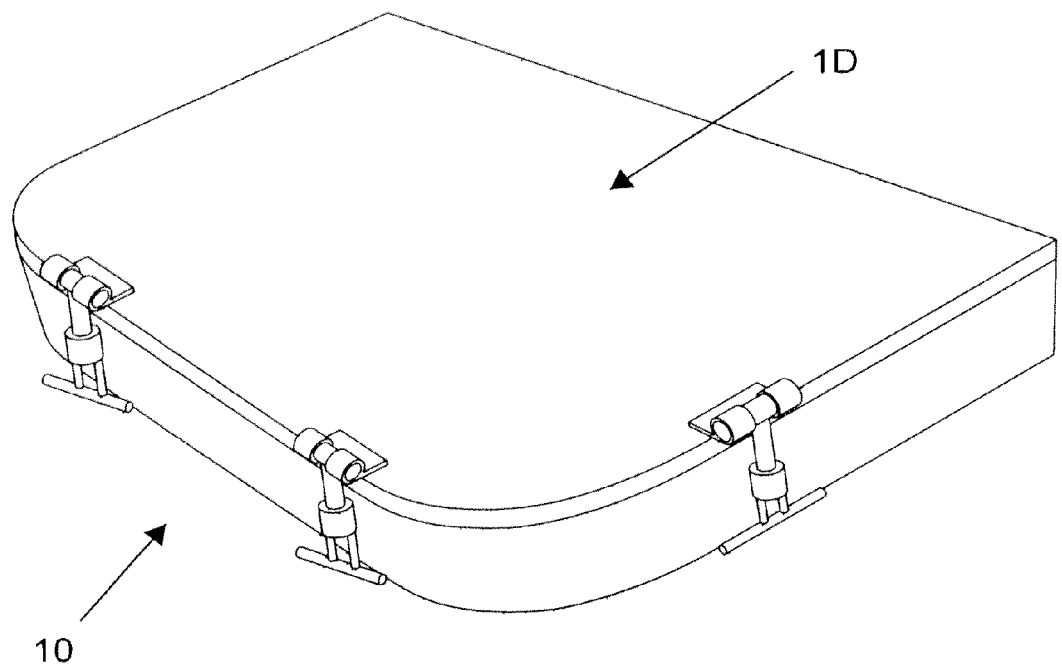
FIG. 3 is an isometric view of the mold of FIG. 1 in a closed position.

FIG. 2, shows a view of the mold 10 of FIG. 1 that further includes prefabricated parts 20 inserted into the mold 10. The prefabricated parts 20 can be, for example, knee pad inserts. The prefabricated parts 20 can be made of a foam-like material that will, for example, adhere to a skin-like material, such as, for example, polyurethane. In another example, a prefabricated part can be used in another portion of the composite seat cushion. For example, a prefabricated part can be used in an area besides a lateral side of the composite seat cushion, such as a middle portion of a front and/or rear side of the composite seat cushion. Such prefabricated parts can vary in shape and size, as is needed for different areas of the composite seat cushion. As shown in the example of FIG. 2, a material 32 is added to the mold 10 that will form a composite seat cushion in the mold. The material 32 can be, for example, a chemical mixture that forms an energy absorbent inner foam-like structure and an outer skin-like structure. The material 32 can be introduced into the mold 10 by a spray device 30, as shown in the example of FIG. 2. The spray device 30 can be configured to spray the material 32 directly into the mold 10. Once a predetermined amount of material 32 has been applied, the mold 10 can be closed (with any prefabricated parts disposed therein) by positioning the core 1A within the mold and positioning the top 1D in a closed, locked position as shown in FIG. 3. The chemical reaction is then allowed to take place for the material 32 and any prefabricated parts 20 to form a composite cushion.

The material 32 can be a chemical mixture, such as a thermoset polymer commonly referred to as polyurethane. The material 32 may include at least two materials, an isocyanate and a polyol that react in the presence of a catalyst. A process for providing the material 32 can be, for example, reaction injection molding. The material 32 can have a make up that will physically bind to any prefabricated materials 20 that are placed within the mold 10 and become a part of the composite seat cushion. A primary chemical compound of the material 32 should adhere to any other prefabricated parts using the same process, if needed, to make up the composite seat cushion, allowing for one single piece when a final molding process is completed. The primary chemical compound can be, for example, a thermoset polymer, such as polyurethane. The primary chemical compound may be designed to be flame retardant to minimize flammability of the composite seat cushion. The mixture of material may be varied to produce different mechanical characteristics, such as, for example, a harder vs. a softer foam-like structure and/or a thicker vs. a thinner skin-like structure. The material may be selected so that a composite seat cushion formed by the material may be repaired with a compound.

According to an exemplary embodiment, the material 32 for forming the composite seat foam structure can include environmentally-friendly materials. Such materials may help to reduce harmful emissions in the production process, such as the emission of fluorocarbons, and may be more environmentally friendly than materials of conventional seat cushions when implemented.

According to another example, a first material, such as polyvinyl chloride (PVC), may be introduced into the mold 10 and onto the interior surfaces of the mold 10 to form the outer skin of the composite seat cushion. The mold 10 may then be closed and a second material, such as polyurethane, may be introduced into the mold 10 to form a foam-type material within the skin-forming material inside the mold. Such a mixture of the second material may include a catalyst to promote a chemical reaction for the second material. The first material and the second material can be selected and processed so that the skin formed by the first material adheres to and is integrally bonded to the foam-type material formed by the second material.

FIG. 3 shows the mold 10 in a closed position. In this position the material 32 can chemically react, set, and form. For example, the material 32 may expand inside the mold 10 as the material 32 reaches its boiling point. As the material 32 expands throughout the mold 10, the mold 10 can act as a heat sink to help cool material 32 that comes in contact with the mold 10, causing a skin-like structure to form as a more dense polyurethane on the surface of the interior of the mold, which forms a skin-like outer surface of a composite seat cushion. The material 32 within the closed mold 10 which does not come in direct contact with the mold cools slower and is less dense, forming a softer and energy absorbent foam beneath the skin-like outer surface. Thus, a seat cushion with a skinned foam that includes a skin integrally bonded to foam can be formed. Such a seat cushion can be a single piece of skinned foam. The skin can be formed as an uninterrupted skin over the outside of the entire composite seat cushion. The thickness of the composite seat cushion, such as the thickness of the foam-type material, can be varied to provide different predefined amounts of energy absorption.

Figure 4:
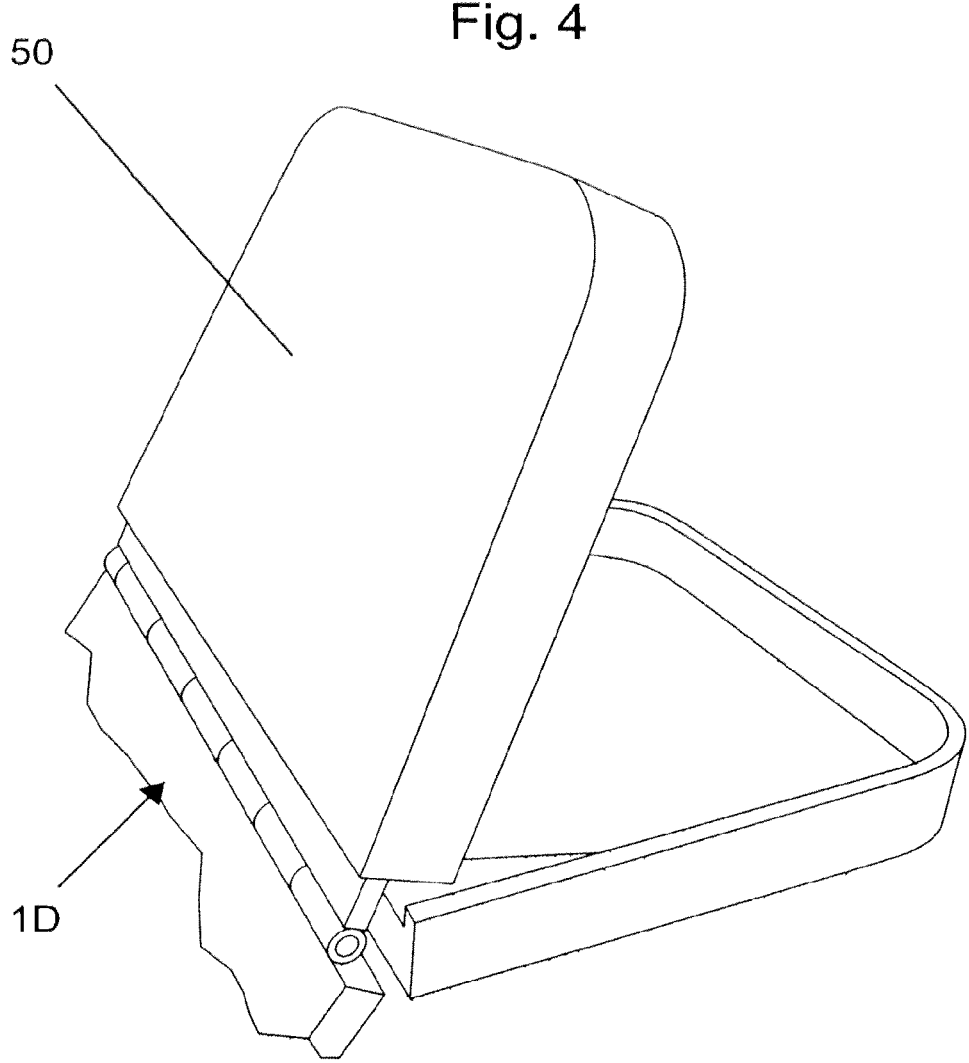
FIG. 4 is an isometric view of the composite seat cushion being removed from the mold, according to an exemplary embodiment.
Figure 5:
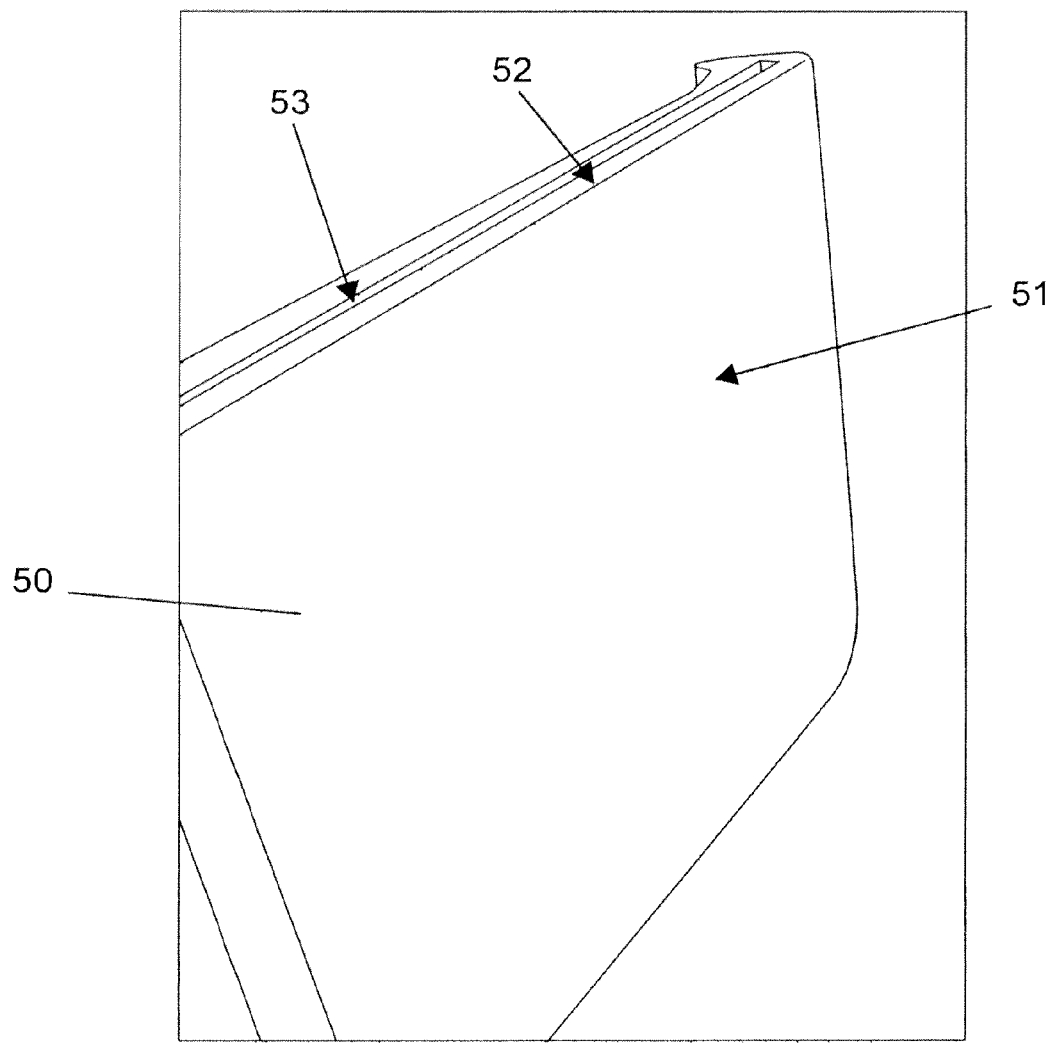
FIG. 5 is a perspective view of the composite seat cushion, according to an exemplary embodiment.

After the chemical compound has cured, the mold may be reopened, as illustrated in FIG. 4. The inner core 1A assists in the process of removing the formed composite seat cushion 50 from the outer side of the mold 10 and can be used to form a cavity 53 inside the seat cushion 50, as shown in the example of FIG. 5. The cavity 53 can be configured to receive at least one of a substantially upright back portion of a school bus seat frame and a substantially horizontal seat portion of the school bus seat frame. The composite seat cushion 50 is then ready to be removed from the inner core 1A. Instead of the core 1A being an integrated feature of the mold, as shown in the examples of the drawings, the core could be consumable, i.e., destroyed in the process of making the composite seat cushion 50. Materials for such disposable cores include, for example, sand, powder, ceramics, and high temperature foam.

FIG. 5 shows an example of a composite seat cushion 50 having an "outer" skin surface 51 and an "inner" foam composition 52, according to an exemplary embodiment. The outer skin surface 51 may be textured and may be flame retardant and meet flammability specifications set forth by the industry, allowing a vinyl cover to be bypassed in favor of the outer skin surface alone. The foam composition of the material 32 used for the seat cushion 50 may be designed to provide energy absorption during a collision event to meet crash protection standards set forth by the industry, depending upon the thickness of the foam.

Figure 6:
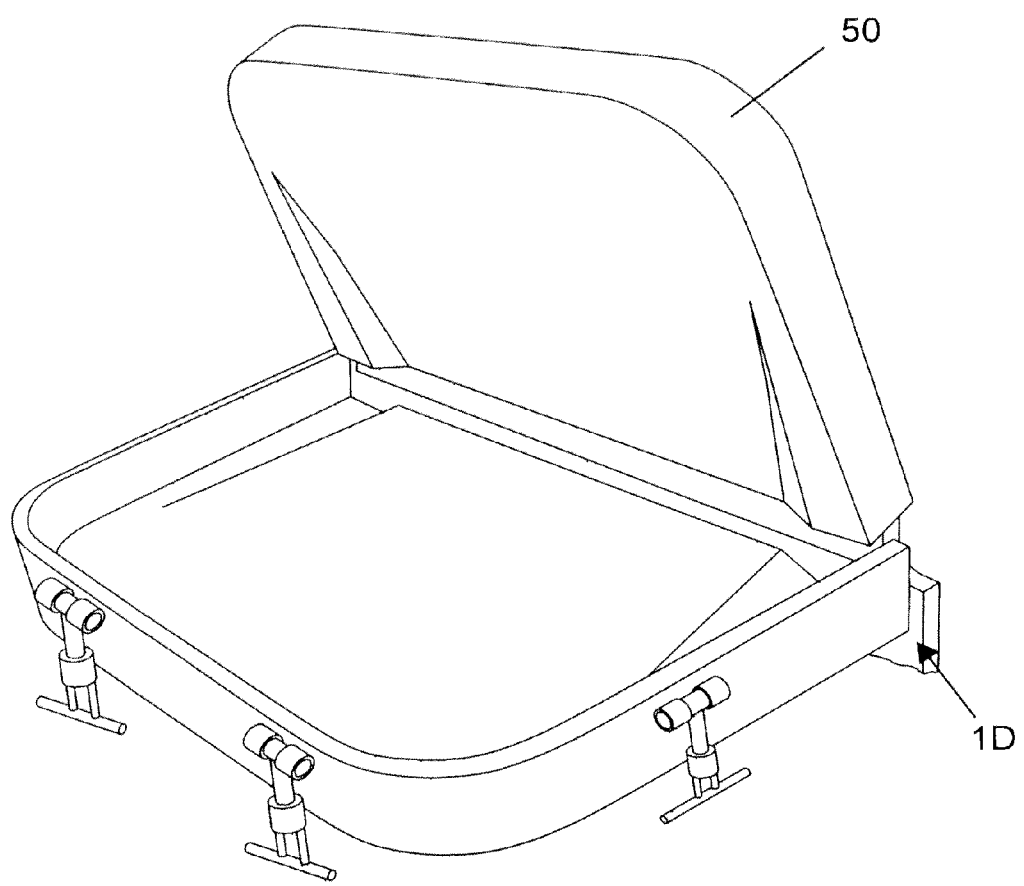
FIG. 6 is an isometric view of the composite seat cushion of FIG. 4 from a rear view and showing the different thicknesses in specified areas, according to an exemplary embodiment.

FIG. 6 shows an example of the composite seat cushion 50 being removed from the mold 10, as viewed from the rear of the seat cushion 50. FIG. 6 demonstrates how the mold may allow different amounts and shapes of material to be formed in specified areas in order to meet desired design criteria, such as designated crash standards as set by the National Highway Traffic Safety Administration (NHTSA) for each particular part of a seat. The mold may be adjusted to allow the composite seat cushion to take any form necessary to fit for any given seat. For example, an indentation is visible between the lateral sides of the composite seat cushion of FIG. 6, demonstrating extra padding, energy absorption, and protection on the lateral edges of the composite seat cushion.

The composite seat cushion constructed by the method illustrated in FIGS. 1-6 may have various properties. For example, different textures or patterns may be "printed," molded, or otherwise formed on the outside of the seat foam (e.g., a logo or mascot of a school, or a school name or nickname) and/or various colors of the outer cover of the seat foam may be used. It also can have lettering molded into the surface, such as, for example, marketing items, logos, seat numbers, serial numbers, date of manufacture, and warnings. The construction of the composite seat cushion permits having small details in design. Moreover, the composite seat cushion can include, for example, inserts (e.g., hard foam, plastic, metal, wood, vinyl) that protrude from the material to protect the material, secure the material to another area, or provide additional features, such as drink holders or trays. The composite seat cushion also could have inserts (e.g., hard foam, plastic, metal, wood, or vinyl) that are completely covered by the material of the composite seat cushion. The composite seat cushion can have dynamic structural features, such as ribs, contours, or ports.

The composite seat cushion also can have skin on all or only some surfaces. The thickness of the skin can be adjusted across the composite seat cushion. Contours can be provided on the surface. Additionally, open sections can be provided to accommodate future applications, such as ports in the seat to handle belts or an opening for a TV or other screen. The composite seat cushion can have features used to indicate impact, wear, or heavy use, such as breakaway striations in surface. For example, if the composite seat cushion is skinned with two colors, one would show through the other. As a further example, the composite seat cushion can be a homogenous single part requiring no additional operations prior to use. The seat back and seat bottom could be molded in a one piece design. Additionally, mounting features can be provided to secure the composite seat cushion to a frame.

FIG. 7 shows the varying thickness of foam created by the mold, and various other dimensions of a presently preferred composite seat cushion (measurements for a front part, a back part, and cavity). Exemplary dimensions can be as follows: length a can be 440-450 mm, or more preferably 443.48 mm; length b can be 425-435 mm, or more preferably 431.80 mm; length c can be 800-840 mm, or more preferably 820.42 mm; length d can be 560-580 mm, or more preferably 571.34 mm; length e can be 660 to 680 mm, or more preferably 673.10 mm; length f can be 900-1100 mm, or more preferably 1003.30 mm; angle g can be 70-90°, or more preferably 84.0°; angle h can be 70-90°, or more preferably 80.0°; length i can be 590-610 mm, or more preferably 596.90 mm; length j can be 70-80 mm, or more preferably 76.20 mm; length k can be 90-110 mm, or more preferably 101.60 mm; length l can be 15-25 mm, or more preferably 19.05 mm; length m can be 20-30 mm, or more preferably 25.40 mm; length n can be 20-30 mm, or more preferably 25.40 mm; radius o can 6-8 mm, or more preferably 7.62 mm; radius p can be 140-150 mm, or more preferably 152.40 mm; and length q can be 530-560 mm, or more preferably 546.35 mm. As another example, the shape of the composite seat cushion is illustrated with the use of angle measurements to illustrate the "incline" of the side of the composite seat cushion. The dimensions may be altered, for example, by changing the dimensions of the mold 10 as described in FIGS. 1 through 6.

Figure 8:
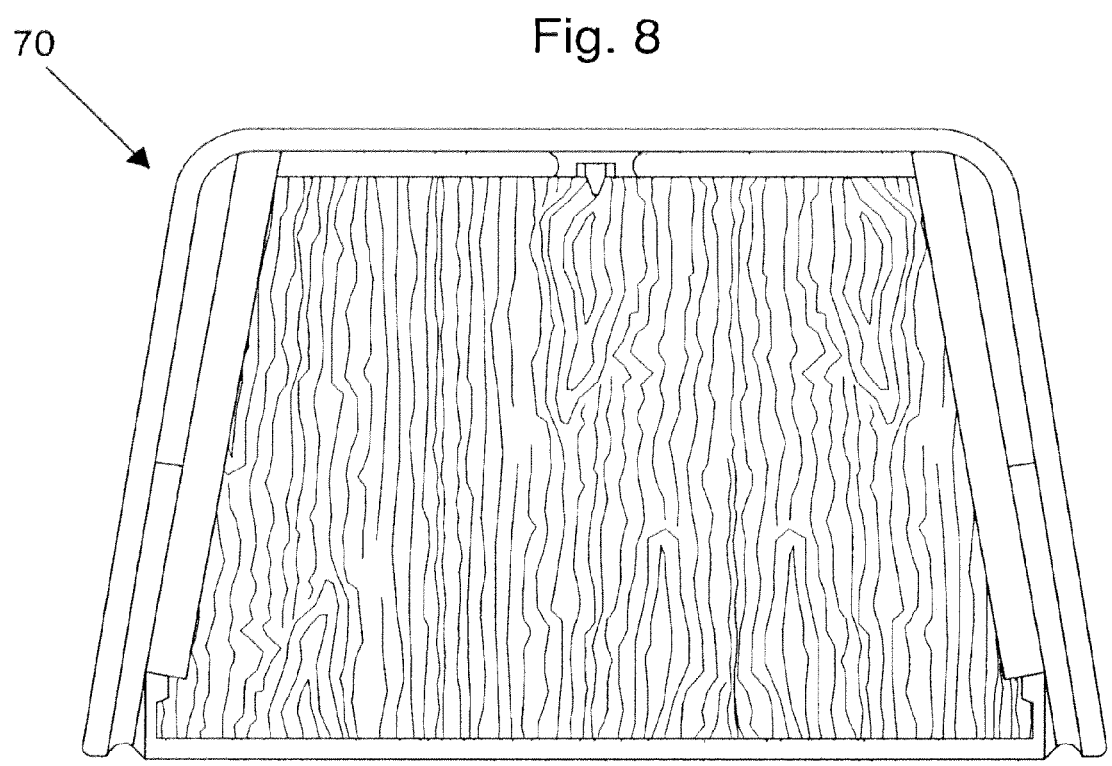
FIG. 8 is a rear view of a seat back frame of a bus seat, according to an exemplary embodiment.
Figure 9:
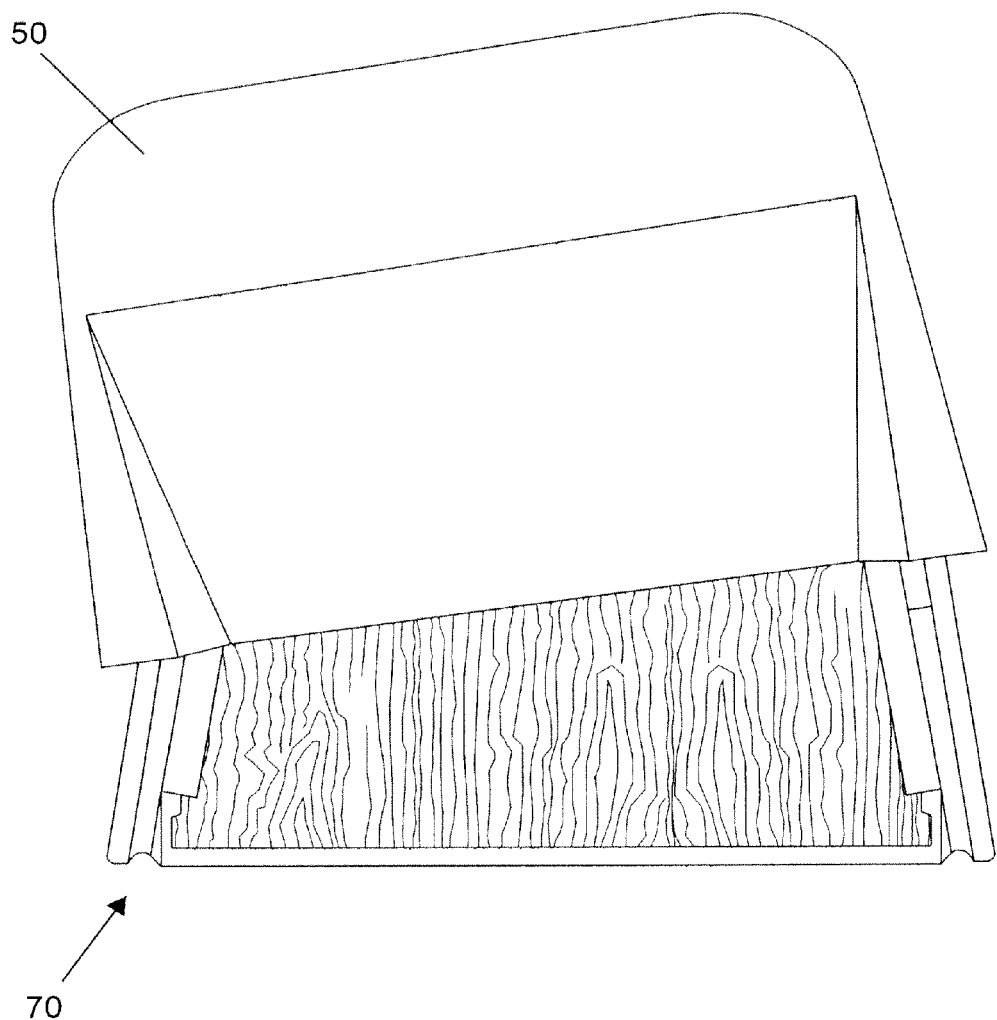
FIG. 9 is a rear view of the composite seat cushion being placed over the seat back frame of FIG. 8, according to an exemplary embodiment.
Figure 10:
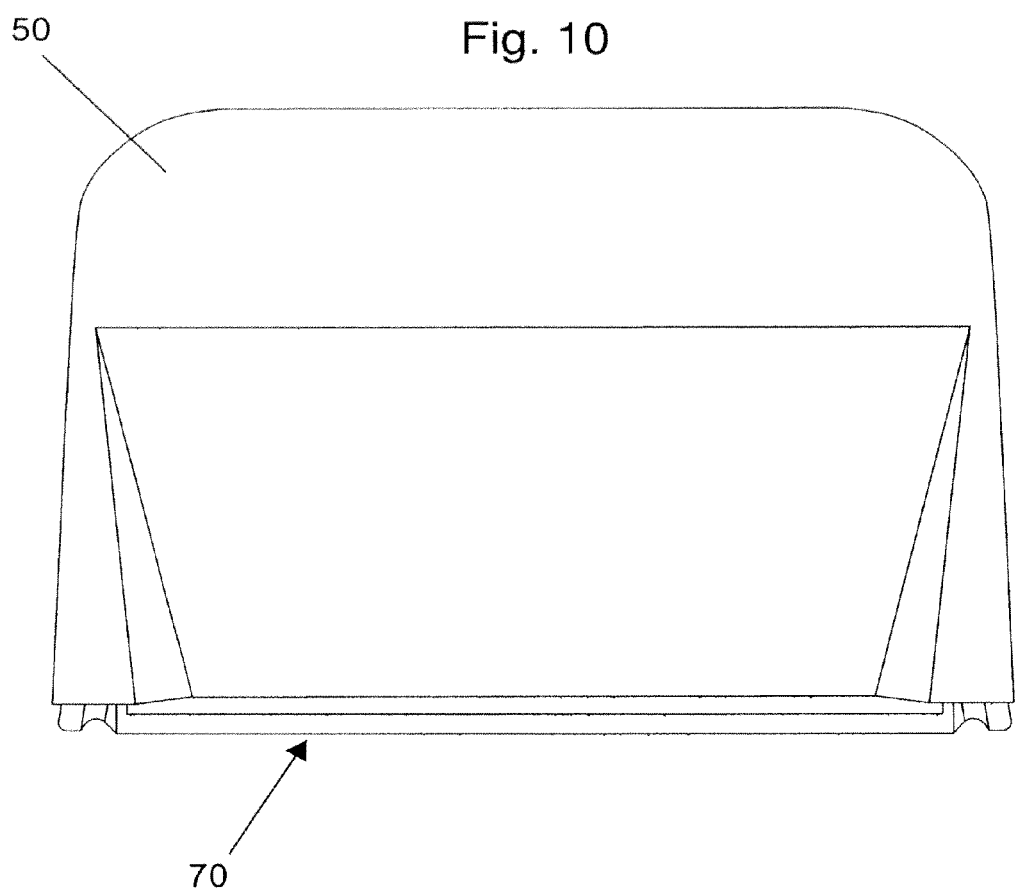
FIG. 10 is a rear view of the composite seat cushion in place over the seat back frame of FIG. 8, according to an exemplary embodiment.
Figure 11:
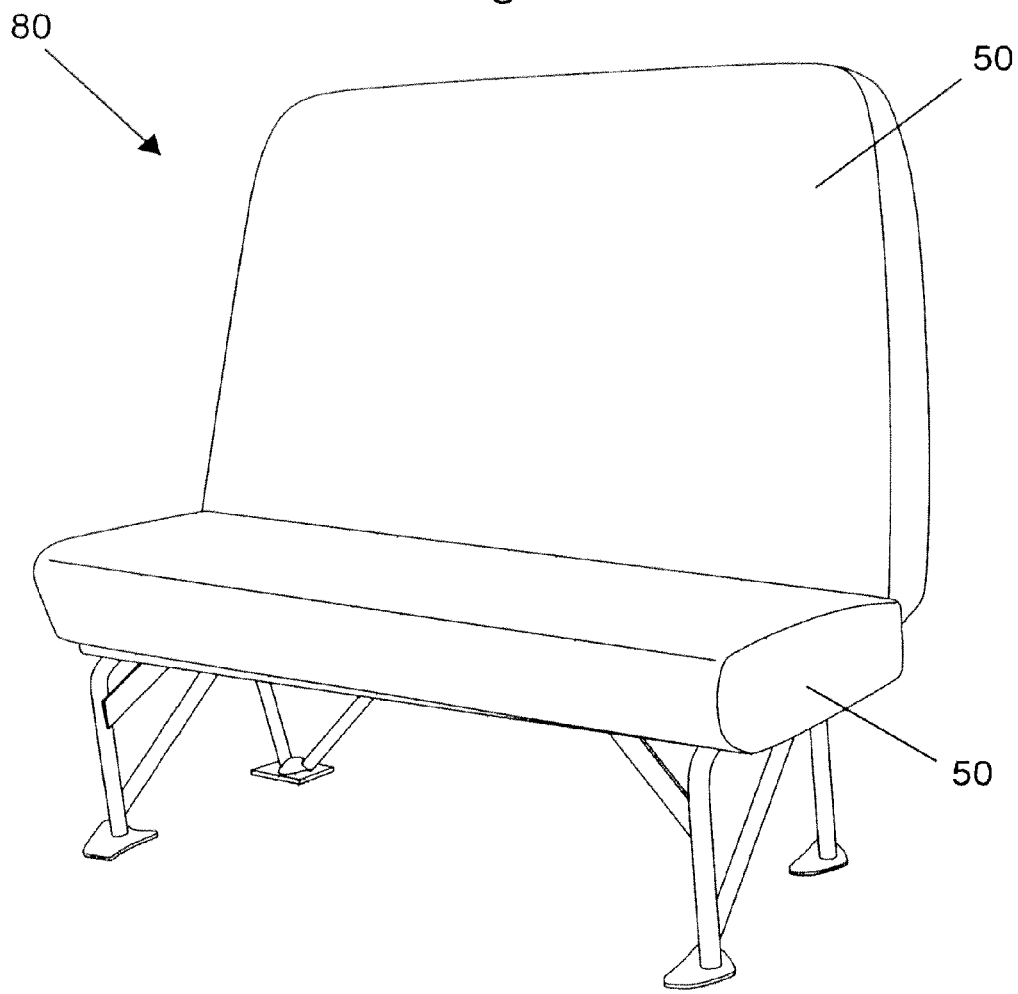
FIG. 11 is a front view of the composite seat cushion in place over the seat back frame of FIG. 8, according to an exemplary embodiment.

FIGS. 8 through 11 illustrate a process of installing a composite seat cushion 50 on a seat frame, such as a seat frame of a bus. FIG. 8 shows a school bus seat back frame 70 without the composite seat cushion (note that the legs of the seat frame are not shown). In FIG. 9, the composite seat cushion is shown being placed over the seat back frame 70 of FIG. 8, from a rear view. The composite seat cushion 50 may be designed such that the foam may be easily slid over the top of the seat frame 70 to cover a substantially upright back portion of the seat frame 70. The dimensions of the composite seat cushion 50 may be adjusted to accommodate different size and shape seat back frames 70. FIG. 10 shows the composite seat cushion 50 in place over the seat frame 70, from a rear view. The composite seat cushion 50 may "lock into place" in a variety of ways (e.g., fasteners, adhesives) or may simply be slid over the seat frame 70 and stay stabilized. FIG. 11 shows the composite seat cushion 50 in place over a seat frame 80, from a front view.

According to alternative embodiments, the composite seat cushion 50 may be installed in a variety of ways (e.g., being fastened to the seat frame, being slid onto the seat frame from the side or the bottom, etc.) and the construction of the composite seat cushion 50 may be adjusted accordingly. For example, the composite seat cushion 50 may be a single piece or may be made up of multiple pieces. The composite seat cushion 50 may be designed for a seat back frame 70, such as a substantially upright back portion of a seat back frame 70, or an entire seat frame 80, such as a substantially horizontal seat portion in addition to, or alternatively to, a back portion of the entire seat frame. The seat frame 80 can be the frame for a vehicle seat, such as a school bus bench seat. Additional padding may or may not be used in conjunction with the composite seat cushion 50 to completely encase the seat frame. Though the composite seat cushion 50 is shown in the drawings with a slip-on configuration, it also may be created in a manner to encapsulate the frame or any structure it is intended to mate with. It also could be molded around the frame itself to create a one-piece unit. The composite seat cushion 50 can also be designed so that a bottom of the seat cushion can be wrapped around a seat frame and secured with a fastener, such as a hook and loop fastener, such as Velcro, buttons, and other fastening devices known in the art.

Many configurations and dimensions of the composite seat cushion are possible, and the composite seat cushion may be adjusted to provided added safety features, such as outward extending portions, such as, for example, side barriers and other dimensions, to help provide additional compartmentalization and/or containment to passengers. This increases the intended safety by helping to contain passengers within their highly padded seats during the event of a collision and/or rollover. Additionally, a mold that is used to form the composite seat cushion may be designed or configured to produce a composite seat cushion with the added safety features built in.

Figure 12:
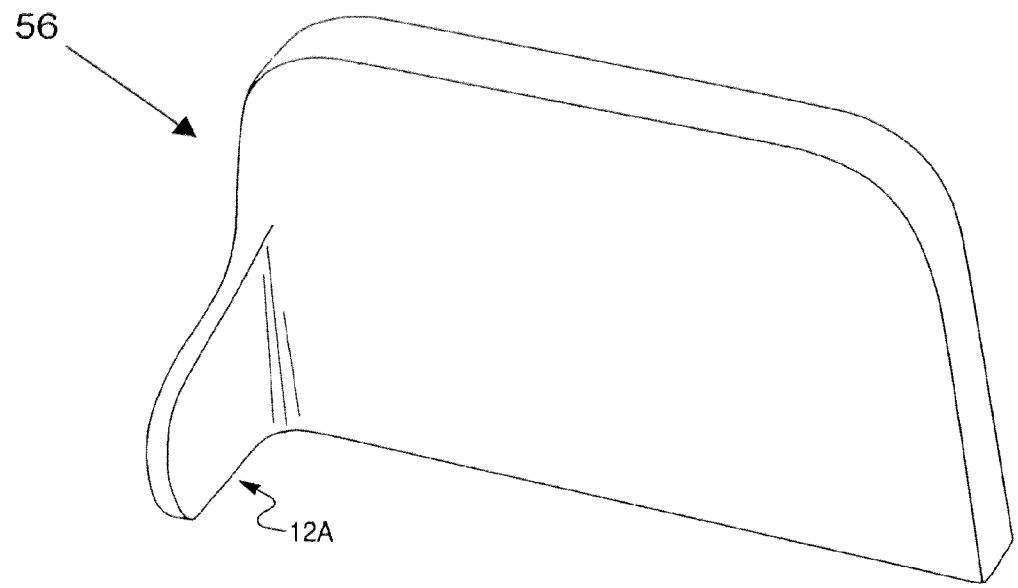
FIG. 12 is an isometric view of a composite seat cushion with an additional aisle side barrier, according to an exemplary embodiment.

FIG. 12 shows an alternative configuration of a composite seat cushion 56 having an outward extending portion, such as a wall or aisle side barrier 12A, according to an exemplary embodiment. As shown in the example of FIG. 12, the wall or aisle side barrier 12A can extend in an aisle direction of a vehicle, such as a school bus. The side barrier 12A can further compartmentalize and contain passengers and can prevent passengers or objects from being thrown from a seat, such as into the aisle of the bus (e.g., during an off-camber collision). The side barrier 12A may be formed on either side of the composite seat cushion 56, such as for protecting the aisle side and the wall side of the passenger in the seat. The side barrier 12A can be formed as part of the composite seat cushion 56 during the molding process by adjusting the shape of the mold.

Figure 13:
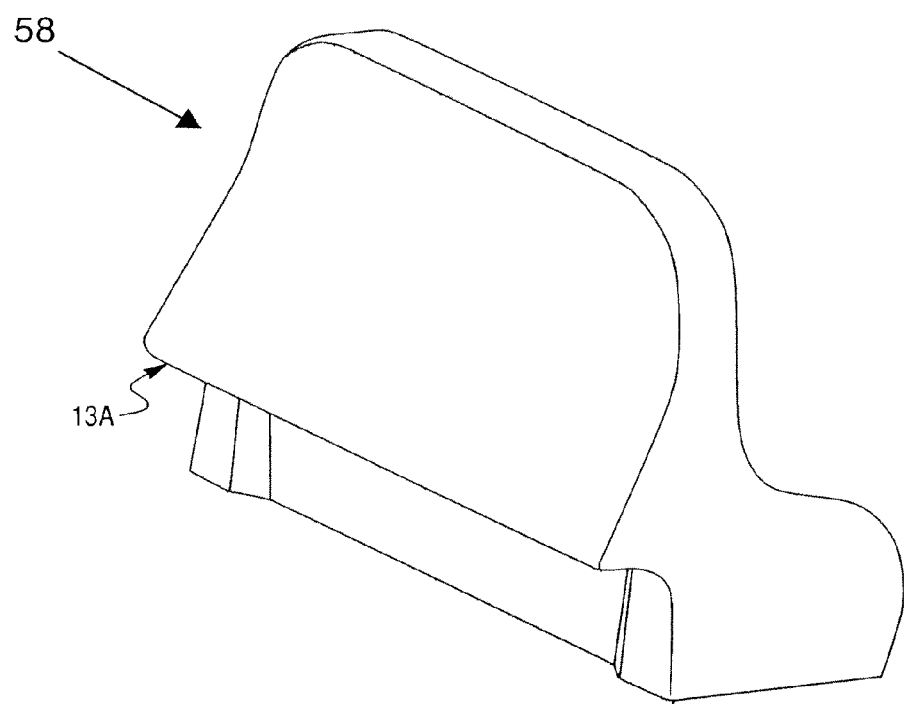
FIG. 13 is an isometric view of a composite seat cushion with an additional rearward extending curvature, according to an exemplary embodiment.

FIG. 13 shows another alternative configuration of a composite seat cushion 58 having an outward extending portion, such as a curvature 13A designed to provide further compartmentalization and containing for the passengers seated directly behind the outward extending curvature 13A. As shown in the example of FIG. 13, the outward extending curvature 13A can extend across a rear surface of a school bus seat along a width of the school bus seat. The rear portion of the composite seat cushion 58 includes the outward extended curvature 13A, which can, for example, be designed to reduce injuries from serious collisions, such as during a rollover of a vehicle. The outward extended curvature 13A can be formed as part of the composite seat cushion 58 during the molding process by adjusting the shape of a mold that the composite seat cushion 58 is made in.

Figure 14:
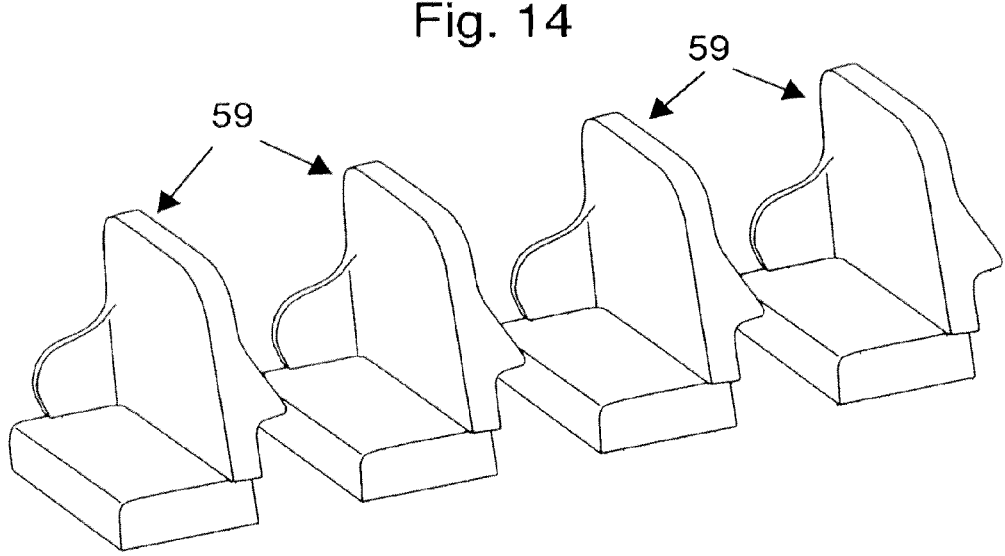
FIG. 14 is an isometric view of multiple seats with the composite seat cushion and the safety features illustrated in FIGS. 12 and 13, according to an exemplary embodiment.
Figure 15:
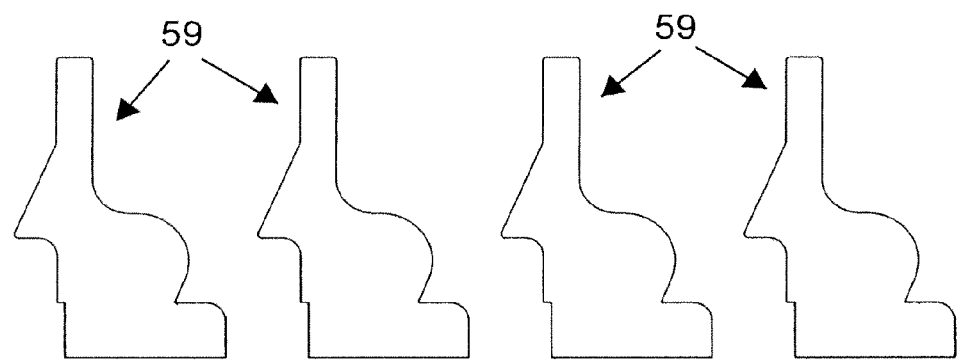
FIG. 15 is an opposite side view of FIG. 14, according to an exemplary embodiment.

FIG. 14 illustrates seats 59 having the features of the composite seat cushions of FIGS. 12 and 13 lined up in a sequential manner, as would be typical, for example, on a standard bus, according to an exemplary embodiment. FIG. 15 is an opposite side view of the seats of FIG. 14. FIGS. 14 and 15 illustrate how the features described in FIGS. 12 and 13 may be combined to provide compartmentalization across a vehicle, such as the entire bus. The sequential manner in which the seat foams are installed allow for each passenger to be provided a degree of protection from rollovers in a collision event by the seat foam in front of him or her.

Figure 16:
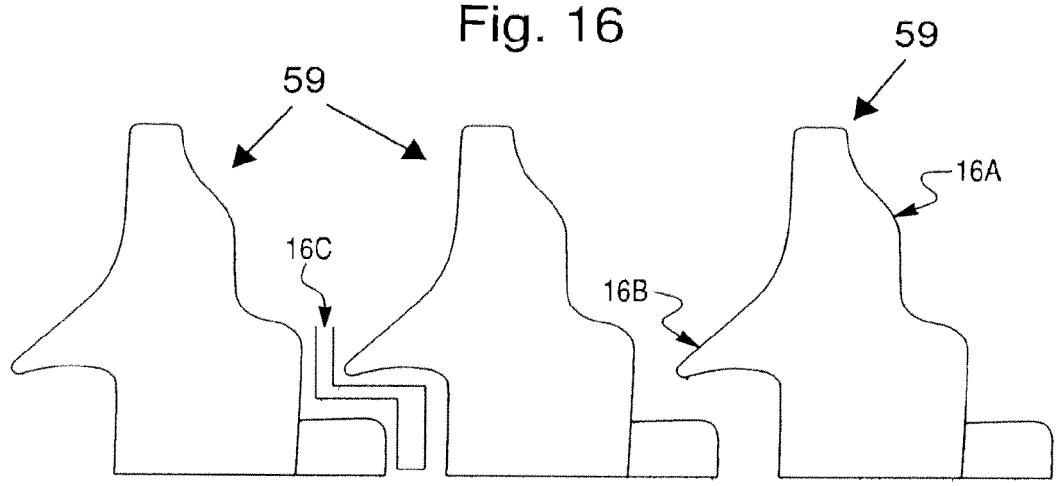
FIG. 16 is a side view of the composite seat cushion of FIGS. 12 and 13 with more pronounced safety features, according to an exemplary embodiment.

Referring to the example of FIG. 16, the seats 59 of FIGS. 12 through 15 are shown, but with more dramatic features that could further enhance the compartmentalized (e.g., passive restraint) safety offered by the seats 59. The features described in FIGS. 12 and 13 are more pronounced. The aisle side barrier 12A of FIG. 12 is shown as expanded in FIG. 16. The expanded side barrier 16A may be designed to protect more of the body and head of the passenger. The outward extended curvature 13A of FIG. 13 is shown as being more pronounced in the example of FIG. 16. The outward extended curvature 16B may be designed to further restrict passenger movement in the case of a collision event. The space outlined by 16C illustrates an exemplary position of the lower body of a passenger when in a vehicle, such as a bus. The various features illustrated in the examples of FIGS. 12 through 16 may be adjusted based on average passenger sizes. For example, more pronounced features as shown in FIG. 16 may be used in school buses where the average passenger size is relatively smaller.

Figure 17:
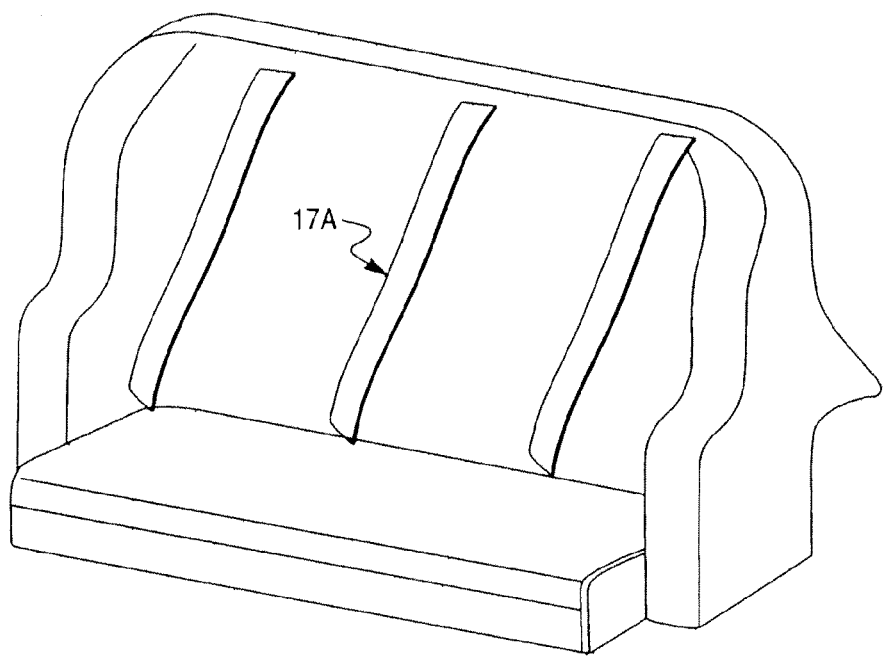
FIG. 17 is an isometric view of a completed assembly of a composite seat cushion and seat back frame incorporated with seat belts, according to an exemplary embodiment.

FIG. 17 shows another embodiment of a composite seat cushion. Various other safety features, for example seat belts, may be used in conjunction with the composite seat cushion. Seat belts 17A (e.g., three-point lap seat belts, shoulder belts, other types of seat belts and seat belt implementations) can be implemented in conjunction with the composite seat cushion. Seat belts 17A may be attached to the seat frame of the seat and fit through notches or holes in the composite seat cushion, or seat belts 17A may be fastened to the composite seat cushion in various manners. Seat belts 17A may be designed with seat belt buckles, or passengers may not need a buckling feature to properly use the seat belts.

The ability to shape the seat back can also be used to integrate with active restraints such as seat belts. When seat belts are used on a vinyl covered bench seat, typical to those currently being used on a school bus, passengers may be seated improperly, thereby diminishing the safety offered by the restraint. By molding the seat into dimensions consistent with the anthropology of student passengers, correct posture within the given seat can be maximized and therefore make best use of active restraints as intended. For example, the use of seat belts 17A may be accompanied by a special composite seat cushion design that promotes proper posture of a seated passenger. The composite seat cushion may be molded such that correct posture is encouraged.

The maintainability of the composite seat cushion may be advantageously improved compared to the maintainability of conventional seat cushions. For example, the composite seat cushion of the present invention may be removed from the seat frame by simply lifting and sliding the composite seat cushion off the seat back frame. This may allow for easier maintenance of the composite seat cushion. The composite seat cushion may be made of a composite material such that repairs to cuts or tears in the composite seat cushion may be mended by the use of a special compound. For example, polyurethane may be sprayed onto the outer skin-type surface and molded inner foam.

It is important to note that the construction and arrangement of the composite seat cushion as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodi-

What is claimed is:

1. A cushion for a school bus seat, comprising:

a single piece of skinned foam including foam and a skin integrally bonded to the foam, the single piece of skinned foam including a top, bottom, front, back, first side, and second side, wherein the first and second sides are at opposing ends of the single piece of skinned foam; and a cavity in a mid-region of the single piece of skinned foam and configured to receive a substantially upright back portion of a school bus seat frame, wherein the cavity provides an opening in the bottom of the single piece of skinned foam, and the opening extends horizontally from the first side of the single piece of skinned foam to the second side of the single piece of skinned foam, and extends vertically upwards into the single piece of skinned foam, while remaining substantially surrounded by the top, front, back, and first and second sides of the single piece of skinned foam;

wherein the cavity in the single piece of skinned foam is empty and has a configuration that permits insertion of the substantially upright back portion into the empty cavity by sliding of the single piece of skinned foam over the substantially upright back portion; and wherein the single piece of skinned foam is configured to provide an envelope structure so as to provide energy absorption on the front, back, and first and second sides.

2. The cushion for a school bus seat of claim 1, wherein the single piece of skinned foam is configured to receive a shoulder seat belt.

3. The cushion for a school bus seat of claim 1, wherein the single piece of skinned foam includes an outward extending portion that is configured to compartmentalize and contain passengers.

4. The cushion for a school bus seat of claim 3, wherein the outward extending portion includes a wall disposed to extend in an aisle direction of a school bus.

5. The cushion for a school bus seat of claim 3, wherein the outward extending portion is configured to extend across a rear surface of a school bus seat along a width of the school bus seat.

* * * * *